Oct. 22, 1940. H. H. BUHR Re. 21,601

CULTIVATOR DISK GANG OPERATOR

Original Filed June 30, 1938 3 Sheets-Sheet 1

Inventor

H. H. Buhr

By Clarence O'Brien and Hyman Berman

Attorneys

Oct. 22, 1940. H. H. BUHR Re. 21,601

CULTIVATOR DISK GANG OPERATOR

Original Filed June 30, 1938 3 Sheets-Sheet 2

Inventor
H. H. Buhr

By Clarence O'Brien and Hyman Berman
Attorneys

Oct. 22, 1940. H. H. BUHR Re. 21,601
CULTIVATOR DISK GANG OPERATOR
Original Filed June 30, 1938 3 Sheets-Sheet 3
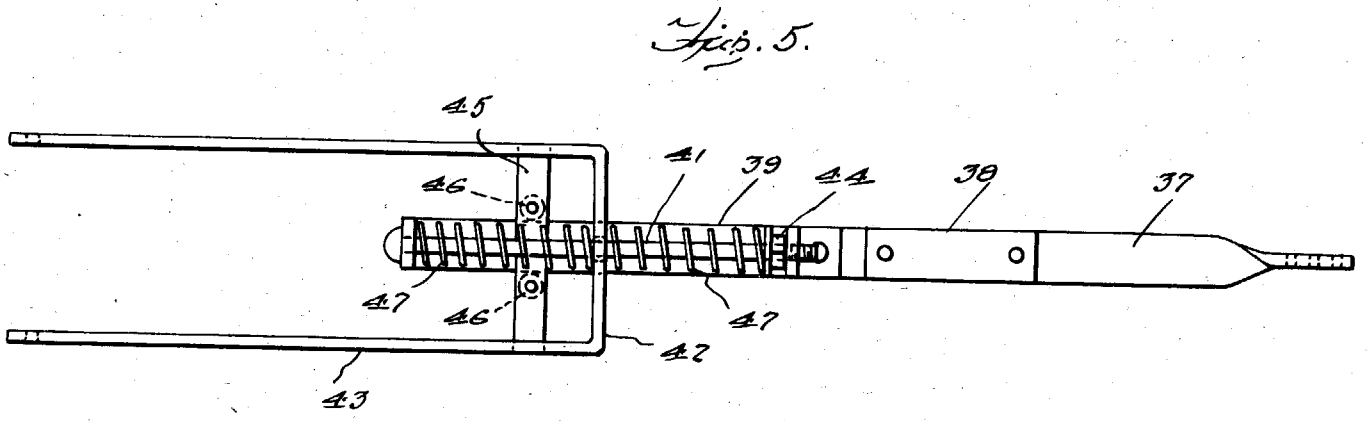
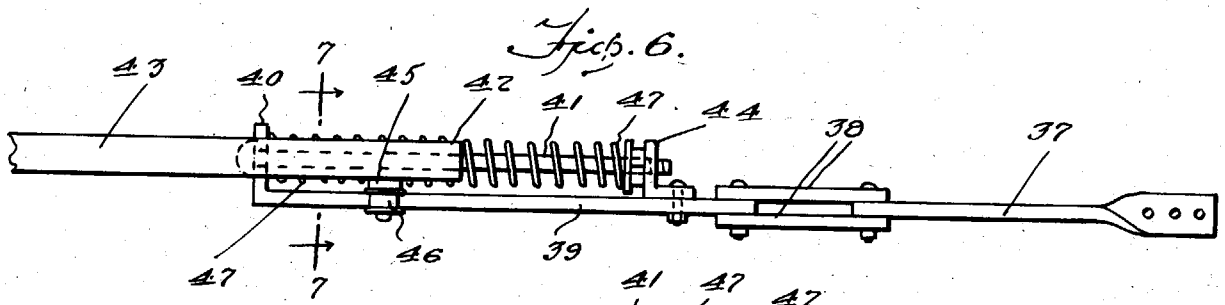
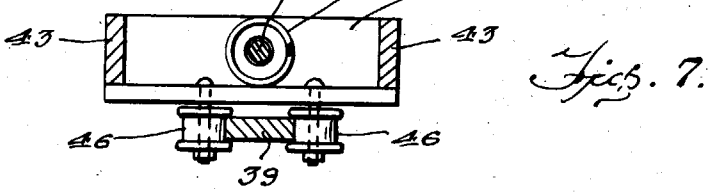
Inventor
H. H. Buhr
By Clarence A. O'Brien and Hyman Berman
Attorneys Reissued Oct. 22, 1940

Re. 21,601

UNITED STATES PATENT OFFICE 21,601

CULTIVATOR DISK GANG OPERATOR

Harry H. Buhr, Sumner, Iowa, assignor of one-half to Fred Buhr, Sumner, Iowa

Original No. 2,152,134, dated March 28, 1939, Serial No. 216,791, June 30, 1938. Application for reissue June 8, 1940, Serial No. 339,580

23 Claims. (Cl. 55—81)

This invention appertains to new and useful improvements in agricultural implements and particularly to a control for disk harrows.

The principal object of the present invention is to provide a control whereby a disk harrow can have its disks angled automatically when connected with a tractor.

Another important object of the invention is to provide a disk harrow constructed in such a manner that it can be employed in conjunction with the usual power take off of a tractor to the end that the operator can control the disks without getting off of the tractor.

A further object is the association of a harrow with a tractor in such a way that the position of a gang of the harrow with respect to another part of the harrow may be changed by means of power derived from the power plant of the tractor.

Another object is the association of an implement with a tractor in such a way that the position of one part of the implement with respect to another part thereof may be adjusted by means of power derived from the power plant of the tractor.

Still another object is the association of a harrow with a tractor in such a way that the position of gangs of the harrow with respect to the frame of the harrow may be adjusted by means of power derived from the power plant of the tractor.

A still further object is the association of a harrow with a tractor in such a way that the position of one harrow gang with respect to another harrow gang may be adjusted by means of power derived from the power plant of the tractor.

Another object is the provision of means for an implement pivotally connected in trail-behind relationship with a tractor for adjusting one part of an implement with respect to another part thereof by means of power derived from the power plant of the tractor.

A further object is the adjusting of the gangs of the harrow connected in trail-behind relationship with a tractor by means of power derived from the power plant of the tractor.

A still further object is the adjustment of a harrow, and more particularly a harrow, connected to a tractor by means of a connection between the tractor and the implement which includes shock-absorbing means.

These and various other important objects and advantages of the invention will become apparent to the reader of the following specification.

In the drawings:

Figure 4 is a perspective view of the tension bar.

Figure 5 is a top plan view of the connecting assembly.

Figure 6 is a side elevational view of the connecting assembly.

Figure 7 is a cross sectional view on the line 7—7 of Figure 6.

Figure 1:
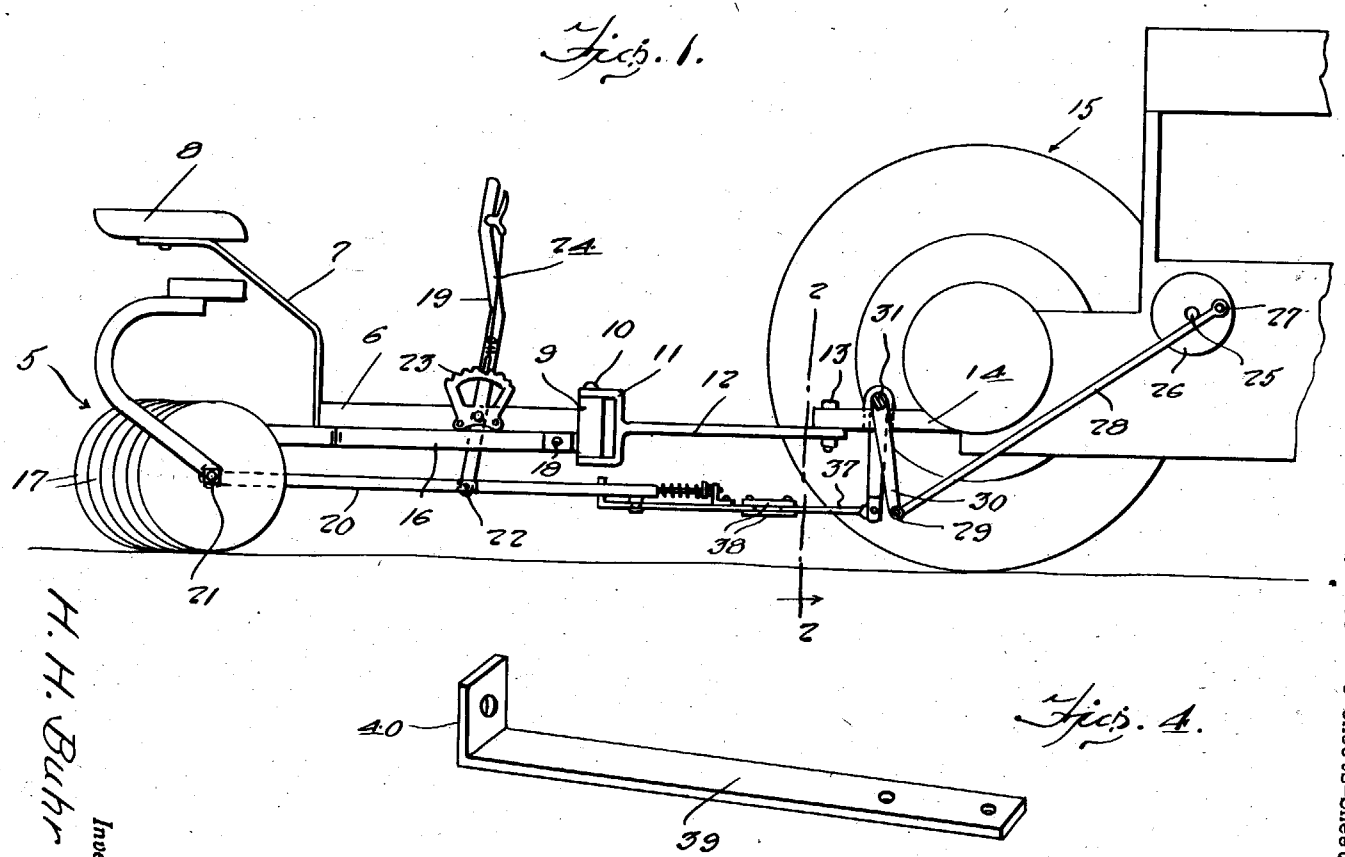
Figure 1 represents a side elevational view of the harrow showing the control means partly in section.

Referring to the drawings wherein like numerals designate like parts, it can be seen that numeral 5 generally refers to the harrow which consists of the platform 6 from which rises the spring 7 supporting the seat 8. A sleeve 9 at its forward end has the pin 10 disposed therethrough and through the yoke 11 at the rear end of the draft tongue 12 which is pivotally secured as at 13 to the draw-bar 14 of the tractor generally referred to by numeral 15. The harrow is connected at the rear of the tractor in trail-behind relationship thereto.

The frame 16 carries the gangs of disks 17 and is pivotally secured as at 18 to the platform 6. Numeral 19 represents the usual lever for operating the connecting rods 20 which are connected to the shafts 21 of the disk gangs pivotally as at 22. A quadrant rack 23 is secured to the platform 6 and against this is operative the detent 24. Thus by shifting the lever 19, the angle of the disk gangs can be changed, but in this connection the operator must be on the platform 6 whereas in carrying out the present invention, the operator may be seated on the tractor 15.

In carrying out the present invention, the usual power take-off adapter 25 is employed. On this is mounted the disk 26 having the eccentric pin 27 disposed through the forward end of the connecting rod 28. The rear end of the rod 28 is pivotally secured as at 29 to the lower end of the arm 30 which depends from the shaft 31. This shaft 31 is journaled through bearings 32 on the draw-bar 14. Numeral 33 represents a U-shaped yoke having the upper ends of its legs secured to the shaft 31. The lower bight portion of this yoke or crank 33 is provided with a pair of depending ears 34—34 apertured as at 35 and through these ears is disposed the bolt 36 for pivotally securing the adjacent twisted end of the bar section 37 thereto. Connecting straps 38 pivotally connect the rear end of this section 37 to the adjacent end of the tension bar 39. The tension bar 39 is provided with the upstanding apertured lug 40 at its rear end and through this is disposed the rod 41 which also extends through an opening in the bight portion 42 of the U-shaped yoke 43 and also through the lug 44 which is secured suitably to the forward end of the tension bar 39.

A cross piece 45 on the yoke 43 supports a pair of rollers 46—46 on its lower side, these rollers being grooved to receive the longitudinal edge portions of the tension bar 39.

A nut is provided on the forward end of the rod 41 and cushioning springs 47 are provided on this rod at the opposite sides of the bight portion 42 of the yoke 43.

The rear ends of the legs of the yoke 43 are apertured to receive the aforementioned pin 22 at which point the lever 19 is connected with the disk gang operating frame 20.

It will be seen that the parts just described comprise a control means between the crank or yoke 33 and the harrow gangs, which means is divided into a pair of sections with shock-absorbing means between the sections. The yoke 43 may be considered to constitute one section and the bar section 37, links 38, and tension bars 39 the other section. The springs 47 connect the sections resiliently and allow them a limited relative movement in two directions.

Thus it can be seen that the driver of the tractor can readily control the disks 17 by clutching the valve take-off means usually found on tractors, this without requiring the stopping of the tractor and actuation of the hand bar 19 and this without requiring a second man on the harrow. When the eccentric pin 27 on the disk 26 is to the right of the adapter 25 as shown in Figure 1, the connecting rod 28 is at its forward position, and the gangs also are in their forward position. When the pin 27 is in a position generally diametrically opposed to that of Figure 1, the connecting rod 28 is in its rearward position and likewise the gangs. Change from one position to the other is accomplished by a half revolution of the disk 26. Thus the power take-off adapter is operative to move the gangs either forward or rearward by power. It is to be understood, of course, that, when the gangs are under control of the power take-off adapter, the detent 24 will be continuously held out of engagement with the quadrant rack 23 so that shifting of the gangs may take place.

The pivotal connection of the bar section 37 with the tension bar 39 by means of the straps 38 provides a flexible portion in the connection between the crank or yoke 33 and the gangs of disks 17 generally adjacent the pivotal connection 13 of the draft tongue 12 with the draw-bar 14 of the tractor. Thus, as the tractor pivots with respect to the harrow about the connection 13 as in turning of the harrow, the links 38 allow the necessary pivoting of the tension bar 39 with respect to the bar section 37.

Figure 2:
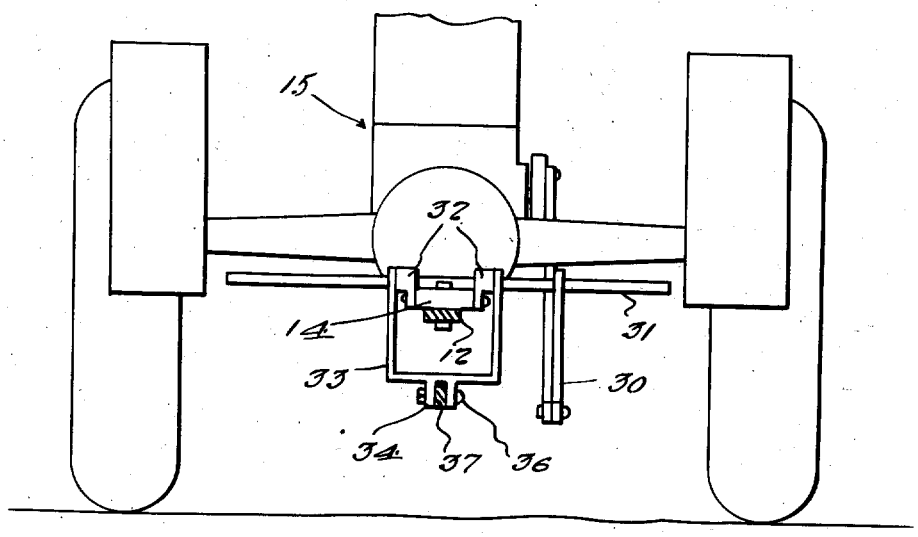
Figure 2 is a sectional view taken substantially on the line 2—2 of Figure 1.
Figure 3:
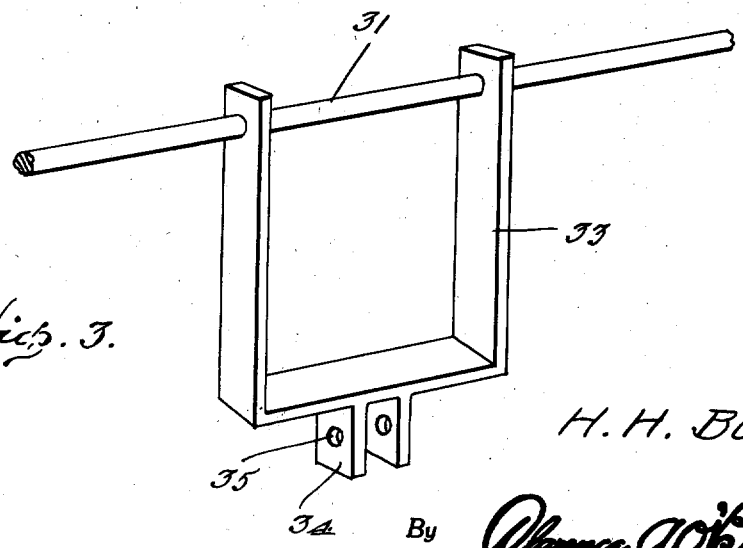
Figure 3 is a perspective view of the yoke shown in Figure 2.

It will be seen from Figure 2 that the power take-off adapter is at the side of the tractor and the bar section 37 is laterally displaced from the adapter a considerable amount, extending from the yoke or crank 33 back to the gangs substantially on the centerline of the tractor and directly beneath the connection 13 and the draft tongue 12 connecting the tractor and the harrow. The taking of power from one point on the harrow and transmitting it to the harrow on a line displaced laterally of the tractor is made possible by the arm 30, shaft 31, and yoke or crank 33, which constitute in effect rockable means mounted on the tractor on an axis extending transversely thereof.

It is to be noted from Figure 1 that the connection between the power take-off adapter 25 and the harrow extends for the most part at substantially the level of the shafts 21 of the harrow gangs. The connecting rod 28 between the adapter and the arm 30 on the rockable means extends beneath the axle of the tractor and is consequently well out of the way of a tractor seat which might, for example, be over the axle.

The power take-off adapter 25 and the disk 26 constitute in a broad sense an outlet for the power plant of the tractor 15.

It is to be noted that the connecting rod 28, arm 30, and yoke or crank 33 may be considered to constitute means on the tractor which have a longitudinal movement with respect to the tractor for shifting the gangs. More broadly they are means shiftable with respect to the tractor in contrast with a regular rotating power take-off shaft extending from the tractor to the harrow.

While the foregoing specification sets forth the invention in specific terms, it is to be understood that numerous changes in the shape, size and materials may be resorted to without departing from the spirit and scope of the invention as claimed hereinafter.

Having described the invention, what is claimed is:

1. In combination, a tractor having a power plant, a harrow including a gang connected at the rear of the tractor, and means connecting the power plant and the harrow for adjusting the gang and including a member mounted entirely on the tractor and being shiftable with respect thereto during flow of power from the power plant to the harrow.

2. In combination, a tractor having a power plant, a harrow including a gang and connected at the rear of the tractor, and means connecting the power plant and the harrow for adjusting the angle of the gang and including a member mounted entirely on the tractor and having a movement longitudinal of the tractor during flow of power from the power plant to the harrow.

3. In combination, a tractor having a rear axle and a power plant, a harrow connected at the rear of the tractor and including a gang, and a connection extending beneath the rear axle of the tractor between the power plant and the harrow for adjusting the gang.

4. In combination, a tractor having a power plant, a harrow connected at the rear thereof and including a gang, and means connecting the power plant and the harrow for adjusting the gang through shifting movement of the means with respect to the tractor and having a portion retained generally adjacent the connection of the harrow and the tractor.

5. In combination, a tractor having a rear axle and a power plant, a harrow connected at the rear thereof and including a gang, rockable means mounted on the tractor on a transverse axis, means passing beneath the rear axle of the tractor and connecting the power plant and the rockable means, and means connecting the gang and a point of the rockable means at the level of the gang.

6. In combination, a tractor having a power plant, a harrow positioned at the rear thereof and including a frame and a gang beneath the frame, draft means connecting the harrow frame to the tractor at the level of the frame, means connecting the power plant of the tractor and the harrow gang for adjusting the angle of the gang, said means passing under the harrow frame and the draft means and being connected to the tractor substantially at the level of the harrow gang.

7. In combination, a tractor having a power plant, a harrow including a gang connected at the rear of the tractor, and means connecting the power plant and the harrow gang for adjusting the angle of the same and including a member mounted on the tractor and being shiftable with respect thereto and shock-absorbing means connecting the shiftable member and the harrow gang.

8. In combination, a tractor, a harrow including a gang connected at the rear of the tractor, and means connecting the tractor and the harrow gang for adjusting the angle of the same and including a member mounted on the tractor and being shiftable with respect thereto and shock-absorbing means connecting the shiftable member and the harrow gang.

9. In combination, a tractor, a harrow including a gang connected at the rear of the tractor, and means connecting the tractor and the harrow gang for adjusting the angle of the same and including a member mounted on the tractor and being shiftable with respect thereto and a connection between the shiftable member and the gang including members resiliently connected to one another for limited relative movement in two directions.

10. In combination, a tractor, an implement connected at the rear thereof and having an adjustable part, and means connecting the tractor and the implement for adjusting the adjustable part thereof and including a member mounted on the tractor and shiftable with respect thereto and a connection between the shiftable member and the implement and including members resiliently connected to one another for limited relative movement in two directions.

11. In combination with a tractor having a power take-off, an agricultural machine including ground-engaging elements, means for changing the angle of the elements, said means including a shaft on the tractor, a crank on the shaft, control means from the crank to the ground-engaging elements, an arm on the shaft, and a connection between the arm and the power take-off.

12. In combination with a tractor having a power take-off, an agricultural machine including ground-engaging elements, means for changing the angle of the elements, said means including a shaft on the tractor, a crank on the shaft, control means from the crank to the ground-engaging elements, an arm on the shaft, and a connection between the arm and the power take-off, a drive disk for the power take-off, said last-mentioned connection being eccentrically connected to the said disk.

13. In combination with a tractor having a power take-off, an agricultural machine including ground-engaging elements, means for changing the angle of the elements, said means including a shaft on the tractor, a crank on the shaft, control means from the crank to the ground-engaging elements, an arm on the shaft, and a connection between the arm and the power take-off, said control means from the crank to the ground-engaging elements being divided into a pair of sections and shock-absorbing means between the said sections.

14. In combination, a tractor having a rear axle and a power plant, a harrow including a gang connected at the rear of the tractor, and means connecting the power plant and the harrow for adjusting the gang and including a member mounted on the tractor and extending ahead of the rear axle and being shiftable with respect thereto during flow of power from the power plant to the harrow.

15. In combination, a tractor having a rear axle and a power plant, a harrow including a gang and connected at the rear of the tractor, and means connecting the power plant and the harrow for adjusting the angle of the gang and including a member mounted on the tractor and extending ahead of the rear axle and having a movement longitudinal of the tractor during flow of power from the power plant to the harrow.

16. In combination, a tractor having a rear axle and a power plant outlet in front of the rear axle, a harrow connected at the rear of the tractor and having a gang, and means connecting the power plant outlet and the harrow for adjusting the gang and including a member passing beneath the rear axle of the tractor and being shiftable with respect to the tractor.

17. In combination, a tractor having a rear axle and a power plant outlet in front of the rear axle, a harrow connected at the rear of the tractor and having a gang, and means connecting the power plant outlet and the harrow for adjusting the gang and including a member passing beneath the rear axle of the tractor and being shiftable with respect to the tractor, the member passing beneath the rear axle of the tractor having a longitudinal movement with respect to the tractor.

18. In combination, a tractor having a rear axle and a power plant outlet in front of the rear axle, a harrow connected at the rear of the tractor and having a gang, and means extending beneath the rear axle of the tractor and between the power plant outlet and the harrow for adjusting the gang by a shifting movement with respect to the tractor and having a portion retained generally adjacent the connection of the implement and the tractor.

19. In combination, a tractor having a rear axle and a power plant outlet in front of the rear axle, a harrow pivotally connected at the rear of the tractor and having a gang, and means extending beneath the rear axle of the tractor and between the power plant outlet and the harrow for adjusting the gang thereof by a longitudinal movement of the means with respect to the tractor and being supported adjacent the connection of the implement and the tractor and having a flexible portion adjacent the said connection.

20. In combination, a tractor having a rear axle, a body, and a power plant having an outlet at one side of the body, a harrow having a gang and connected at the rear of the tractor at a point displaced laterally from the power-plant outlet, and means for adjusting the harrow gang comprising rockable means mounted on the tractor, means connecting the power-plant outlet and a point on the rockable means generally in alinement with the power-plant outlet longitudinally of the tractor, and means connecting the harrow and a point on the rockable means generally in alinement with the connection of the tractor and the implement longitudinally of the tractor and passing beneath the rear axle of the tractor.

21. In combination, a tractor having a body and a power plant having an outlet at one side of the body, a harrow having a gang and connected at the rear of the tractor at a point displaced laterally from the power-plant outlet, and means for adjusting the harrow gang comprising rockable means mounted on the tractor on a transverse axis, means connecting the power-plant outlet and a point on the rockable means generally in alinement with the power-plant outlet longitudinally of the tractor and beneath the said transverse axis of the rockable means, and means connecting the implement and a point on the rockable means generally in alinement with the connection of the tractor and the implement longitudinally of the tractor and beneath the said transverse axis of the rockable means.

22. In combination, a tractor having a rear axle and a power-plant outlet in front of the rear axle, a self-supported implement connected at the rear of the tractor in trail-behind relationship thereto and comprising relatively adjustable parts, and a connection extending beneath the rear axle between the power-plant outlet and the implement for adjusting one part thereof with respect to another.

23. In combination, a tractor having a rear axle and a power-plant outlet in front of the rear axle, a self-supported implement connected at the rear of the tractor in trail-behind relationship thereto and comprising relatively adjustable parts, and a connection extending beneath the rear axle between the power-plant outlet and the implement for adjusting one part thereof with respect to another by a shifting movement with respect to the tractor and having a portion retained generally adjacent the connection of the implement and the tractor.

HARRY H. BUHR.